United States Patent [19]

Namba et al.

[11] Patent Number: 5,676,922
[45] Date of Patent: Oct. 14, 1997

[54] CHEMICAL REACTOR REPLACEMENT METHOD

[75] Inventors: Shigeaki Namba; Shoji Takahashi, both of Hitachi; Toshiki Kahara, Toukai-mura; Nobuhiro Seiki, Hitachi, all of Japan

[73] Assignee: Hitachi, Ltd., Tokyo, Japan

[21] Appl. No.: 725,241

[22] Filed: Oct. 4, 1996

Related U.S. Application Data

[63] Continuation of Ser. No. 141,516, Oct. 27, 1993, abandoned.

[30] Foreign Application Priority Data

Oct. 29, 1992 [JP] Japan .................................. 4-291219

[51] Int. Cl.$^6$ .................................................. C01B 3/26
[52] U.S. Cl. .......................... 423/659; 423/651; 423/652; 423/DIG. 6
[58] Field of Search .......................... 423/659, 650, 423/652, DIG. 6, 651

[56] References Cited

U.S. PATENT DOCUMENTS

| | | | |
|---|---|---|---|
| 2,333,845 | 11/1943 | Danforth | 423/659 |
| 3,307,921 | 3/1967 | Junginger | 423/659 |
| 3,792,980 | 2/1974 | Vollmer et al. | |
| 3,838,536 | 10/1974 | McCoy | 423/659 |
| 3,898,295 | 8/1975 | Wanka et al. | 423/659 |
| 3,943,037 | 3/1976 | Siegert et al. | |
| 4,241,902 | 12/1980 | Fisher et al. | |
| 4,478,814 | 10/1984 | Kesten et al. | 423/659 |
| 4,668,494 | 5/1987 | Van Hook | 423/659 |

FOREIGN PATENT DOCUMENTS

| | | |
|---|---|---|
| 3010337 | 8/1981 | Germany. |
| 3041045 | 5/1982 | Germany. |
| 3227097 | 1/1984 | Germany. |
| 4-190567 | 7/1992 | Japan. |

*Primary Examiner*—Wayne Langel
*Attorney, Agent, or Firm*—Fay, Sharpe, Beall, Fagan, Minnich & McKee

[57] ABSTRACT

A faulty chemical reactor in a chemical plant is removed, heat exchange is conducted between the faulty chemical reactor and a new chemical reactor with which the faulty chemical reactor is to be replaced, and then the new chemical reactor is installed at the position from which the faulty chemical reactor was previously removed.

22 Claims, 5 Drawing Sheets

CHEMICAL REACTOR REPLACEMENT METHOD

This is a continuation application of Ser. No. 08/141,516, filed Oct. 27, 1993, abandoned.

BACKGROUND OF THE INVENTION (1) Field of the Invention

The present invention relates to a method of and an apparatus for replacing chemical reactors in a chemical plant.

(2) Description of the Related Art

Reaction temperature often constitutes a major condition in a chemical reaction process generally used for industrial purposes. Normally, the chemical reaction process takes place more often on the high temperature side rather than on the normal temperature side. In the event that the operation of some chemical reactors becomes faulty and must be replaced then a long time will be required to cool down by heat dissipation, for example, if the operating temperature is higher. This results in a loss of time as well as loss of heat dissipated at the time of heat discharge and therefore means a very ineffective replacement of reactor.

From the viewpoint of plant operability, this means reduction of the yield equivalent to the number of reactors which are paralleled off. Alternatively if reduction of the yield is not allowed, plant operation has to be performed with each reactor overloaded during the remaining operation. In any case, the reaction environment of the chemical reactor should be adjusted to the same level as that of each reactor during the remaining operation as early as possible; namely, it is desired to complete preparation to start up new reactors for parallel installation.

In the conventional method, the normal temperature for standby conditions is raised to a high temperature by the standby device, which uses an external heat source to prepare for new chemical reactors for parallel installation. This conventional method is not an effective method because of the time required to cool down the faulty equipment and the external heat source required for temperature rise for the new equipment.

SUMMARY OF THE INVENTION

An object of the present invention is to provide a method of and an apparatus for replacing a chemical reactor in a chemical plant, which are suitable for reducing the time and thermal loss required for replacing the chemical rector with a new chemical reactor.

Another object of the present invention is to provide a method of and an apparatus for replacing a chemical reactor in a chemical plant, which are suitable for reducing the time of overloaded operation imposed on the chemical plant or the yield loss thereof in the case where the chemical reactor is replaced with a new chemical reactor.

Still another object of the present invention is to provide a method of and an apparatus for replacing a chemical reactor in a chemical plant, which are useful to improve maintainability and availability of the chemical plant.

The present invention is directed to a method of and an apparatus for replacing a chemical reactor in a chemical plant whose temperature during operation is different from that while the chemical plant is not in operation, wherein energy of the chemical reactor is transferred to a new chemical reactor and the former chemical reactor is replaced with the energy-transferred new chemical reactor.

The present invention provides effective functions especially in the chemical reaction process in the process industry using the general chemical reaction, hydrogen manufacturing equipment, fuel batteries where the operation temperature is high.

The present invention may include the case when the high heat of a chemical reactor which has been operating is transferred to a chemical reactor of normal temperature to be newly started, as well as the case when the lower temperature heat of the chemical reactor which has been operating is transferred to the chemical reactor of normal temperature to be newly started. Therefore, what is referred to as "transfer of energy" according to the present invention denotes both of these types of transfer.

According to a preferred embodiment of the present invention, energy such as heat energy of a chemical reactor which has been operating or electric power generated in said reactor, is transferred to the chemical reactor for which the plant operation is to be newly started, when some or all of the chemical reactors are to be replaced in the plant which basically uses the chemical reaction process and which is provided with one or more chemical reactors whose temperature during the plant operation is different from that during plant shutdown.

When replacing both chemical reactors, the heat of the chemical reactors during operation or immediately after operation has been stopped, or the available electric power, is evaluated; at the same time, the temperature of the chemical reactor for parallel installation in the plant which has been prepared for replacement is also evaluated. Then heat of both reactors is exchanged so that the thermal conditions of both chemical reactors will be the same, simultaneously allowing supply of heat to the reactor to be heated, and removal of heat from the reactor to be cooled; this ensures effective replacement of said reactors.

This heat exchange operation preferably uses a heat exchange medium, flow channel therefor, and a pressure source for circulation of the heat exchange medium. Furthermore, it also uses a flow channel switching mechanism such as valves, and a medium supply/discharge system, whenever required. To ensure temperature conditions which would most effectively promote chemical reaction and strength of the members constituting the reactor, it is necessary to set up the conditions to minimize the thermal stress or to prevent rupture due to excessive pressure. For this purpose, adequate temperature and pressure conditions are often required as conditions for reaction field in the chemical reaction process. To meet this requirement, it is preferred to provide means to control the pressure for circulation of the heat exchange medium, or to control temperature by an external heat pump system or electric heater during or after heat exchange.

If the chemical reactors are designed to generate heat, electric power which can be generated by the existing chemical reactors at the time of replacement can be used as energy. Since the energy input for promoting a chemical reaction is generally given, and the chemical reaction itself is often moved forward by exchange of electrons, the reaction of any one of the reactors is estimated to move so as to increase the potential field of moving electrons in the parallel operation of the rise and fall of the reactor temperatures.

When there is only one chemical reactor the yield of reaction product becomes zero once during replacement. Even in this case, the application of this invention is basically the same for the chemical reactor to be newly started.

When one of two chemical reactors that have reached the thermally balanced state requires a temperature increase, it is preferred to raise the temperature, by using some appropriate means such as an external power supply to heat the electric heater if the reactor is provided with such a heater, by using the heat pump to collect heat from the low-temperature heat source and to feed it to the high-temperature heat source, or by indirectly heating the reactor through secondary heat exchange of the heat exchange medium by extracting a very small amount of high-temperature fluid from the main process system under operation.

Regarding the equipment required for heat exchange but not for normal operation, it is preferred to provide central installation of the parts required for maintenance of one reactor. Therefore, it is possible to realize a more effective reactor replacement method in a chemical plant, by preparing a separate maintenance skid containing an integral constitution of a piping means for circulation of the heat exchange medium, flow channel switching means, forced circulation means, heat exchange medium storage means, and their control means, and by standardizing the working procedures and reactor layout for reactor replacement to achieve a reduction in manpower and an increase in reliability for installation of the reactors.

According to a preferred embodiment of the present invention, the temperature of the chemical reactor to be stopped can be brought back more quickly to the normal temperature level, whether it is high or low, while the temperature of the chemical reactor to be started can be brought close to the operating temperature more quickly, resulting in minimized thermal loss. This technique cuts down the time required to reach the same temperature, compared with the case of natural heat discharge. This results in reduced waiting time for plant equipment maintenance and improved plant availability, and reduced load rate rise time for the chemical reactor being operated as a remaining plant.

DESCRIPTION OF THE PREFERRED EMBODIMENTS

One embodiment of the present invention will be described with reference to a hydrogen gas production plant.

Figure 1:
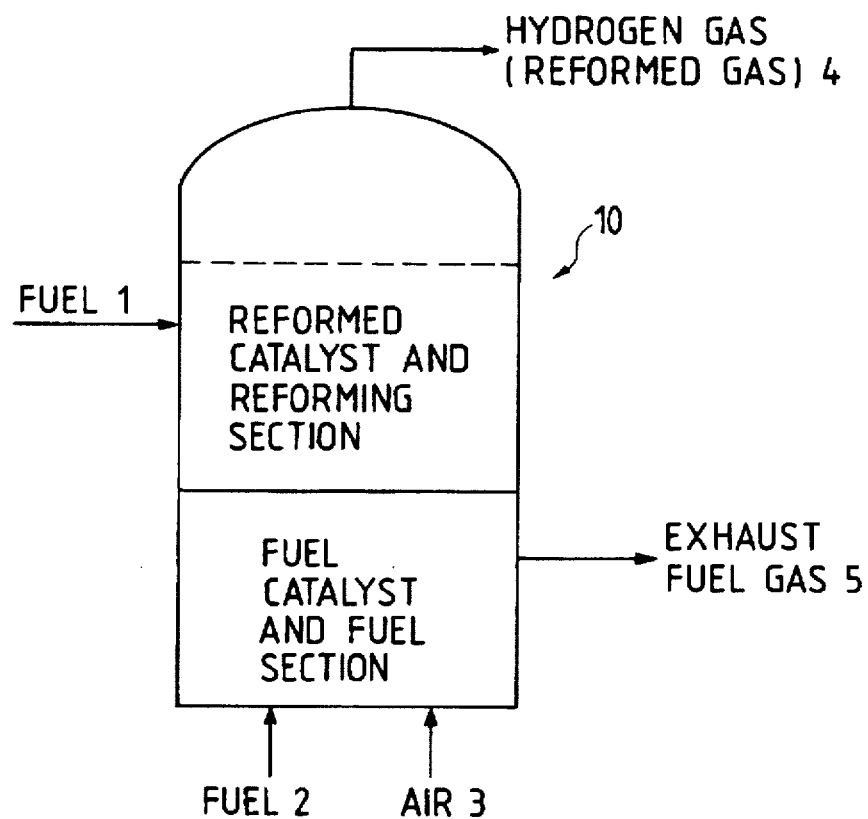
FIG. 1 is a schematic diagram representing an example of the conventional chemical reactor.

FIG. 1 shows the conventional chemical reactor 10 that produces hydrogen gas by reforming LNG, which is representative of the hydrogen gas production equipment used in the hydrogen gas production plant.

The reactor 10 is provided with a process system comprising a fuel supply system 1 for reforming, a fuel supply system 2 to supply heat required for the reforming reaction, and an air supply system 3 for combustion. The reactor 10 also has a recovery system comprising a hydrogen gas discharge system 4 and a fuel gas discharge system 5. These systems are connected through the reaction field inside one of the reactors 10. Conversion from hydrocarbon to hydrogen gas (reforming), which is an endothermal reaction, is carried out with the aid of the reforming medium and combustion medium at the reforming section and combustion section inside the reactor.

Figure 2:
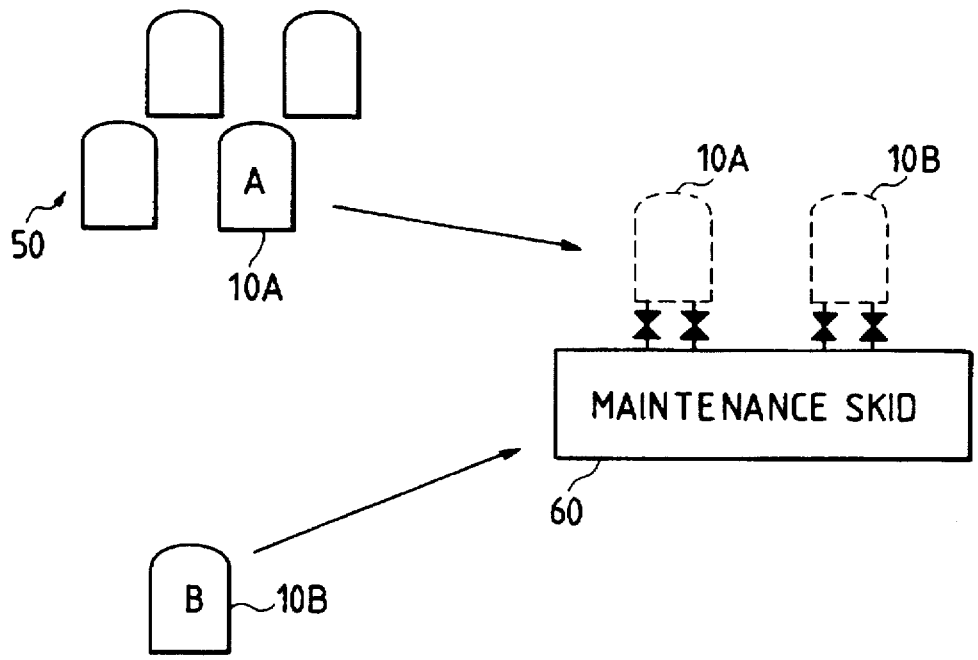
FIG. 2 is a schematic pictorial view for explaining of an example of a chemical reactor replacement method according to the present invention.

As illustrated in FIG. 2, more than one such chemical reactor 10 is normally installed in the hydrogen gas production plant, constituting a group 50 of chemical reactors.

During the operation of the hydrogen gas production plant, if chemical reactor 10A in a group 50 of chemical reactors has become faulty, requiring replacement then chemical reactor 10A must be stopped and replaced at the normal temperature by chemical reactor 10B which is standing by.

The reactors 10A and 10B to be swapped are carried on a maintenance skid 60, which will be described later, and are set thereon.

Figure 3:
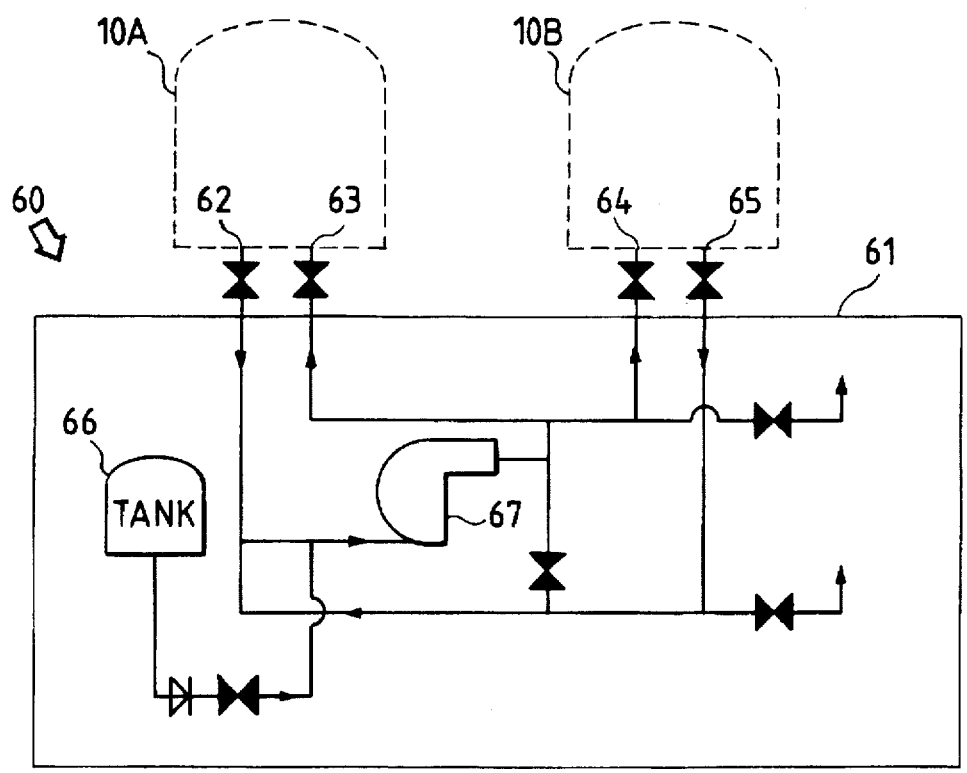
FIG. 3 is a conceptual view of an embodiment of a chemical reactor replacement apparatus according to the present invention.

Referring to FIG. 3, the top ends of pipes 62, 63, 64 and 65 to be connected to the piping route for normal operation inside the chemical reactors 10A and 10B are exposed to the outside on the frame 61 of the maintenance skid 60. The chemical reactor 10A which requires replacement due to operation failure and a chemical reactor 10B which is standing by at the normal temperature are connected to the maintenance skid 60 through said pipes and are set there.

The maintenance skid 60 is provided with the tank 66 which incorporates the medium essential for heat exchange such as inert gas, and a fan 67 to circulate the heat exchange medium. The pipes 62, 63, 64 and 65, the heat exchange medium storage tank 66 and the fan 67 are connected in such a way that, after the heat exchange medium in the heat exchange medium storage tank 66 has passed through the piping route inside the chemical reactor 10A by means of the piping system inside the skid and the valve mechanism, it passes through the piping system inside the other chemical reactor 10B and is discharged into the atmosphere.

The heat exchange medium is circulated as shown with arrows in FIG. 3. Namely, the piping system including the pipes 62, 63, 64 and 65 of the skid is filled with the heat exchange medium from the tank 66; then the fan 67 causes the heat exchange medium to flow to the chemical reactors 10A and 10B through the pipes 63 and 64, and further to flow from the chemical reactors 10A and 10B to the inlet of the fan 67 through the pipes 62 and 65. Thus, the energy of chemical reactor 10A (such as, for example, heat energy) is transferred to the chemical reactor 10B to be newly started; both reactors reach the state of temperature equilibrium as a result of heat exchange.

When air is used as the heat exchange medium, the heat exchange medium storage tank 66 is not always necessary. It is also possible to configure the system such that air is directly sucked and is circulated from the chemical reactor 10A which requires replacement by the other reactor 10B, and is then discharged. Heat exchange medium storage tank 66 can be used only to purge the inside of the system before circulation.

After both reactors have reached the state of temperature equilibrium, the new, energy chemical reactor 10B is removed from maintenance skid 60, and is installed at the position of chemical reactor 10A which was previously removed. This completes the replacement of chemical reactors.

The above procedure ensures effective use of the heat discarded so far, through heat exchange between the chemical reactor immediately after operation stop and the chemical reactor to be started, and allows a substantial reduction of time and energy, when compared with the conventional cases where temperature is lowered by natural heat discharge at the time of operation stop and is raised by the external energy at the time of operation start. If the chemical reactors are so designed as to depend on the pressure of the circulating fluid (not illustrated), circulating pressure of the medium required for heat exchange should be controlled by the pressure control mechanism provided on the piping system of the maintenance skid 60.

Figure 4:
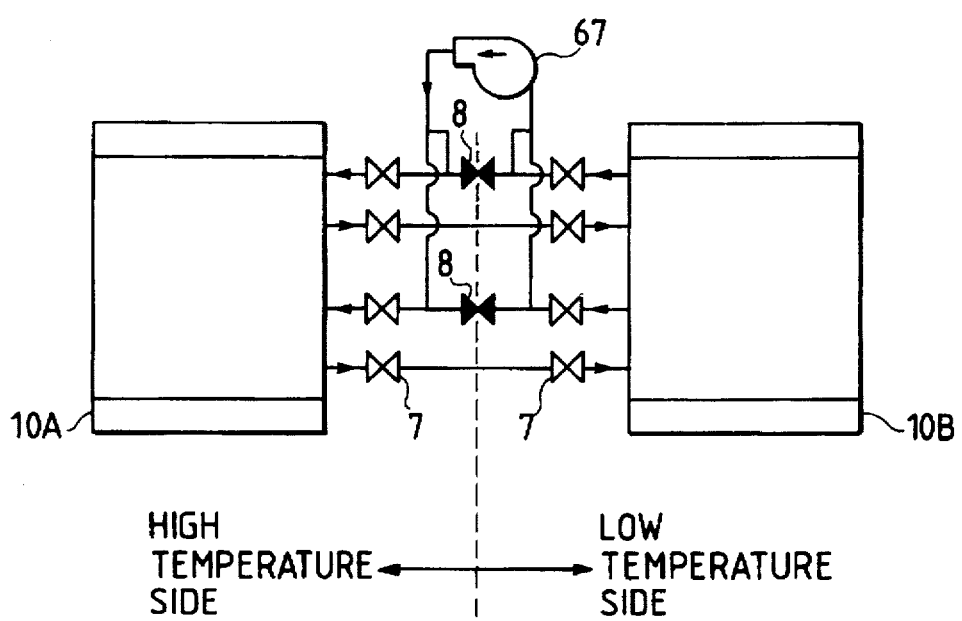
FIG. 4 is a conceptual view of another embodiment of a chemical reactor replacement apparatus according to the present invention.

Referring to FIG. 4, the chemical reactor 10A on the left is the one that has been operating, while the chemical reactor 10B is to be started in parallel operation, and is usually kept at normal or low temperature. The maintenance skid in the drawing represents only the piping system schematically illustrated. In this embodiment, the pipe is laid on the maintenance skid and is connected to the piping of the maintenance skid, after inert gas has replaced the reaction gas inside the pipe which is used during the operation at the reaction section of these two reactors. In this case, while keeping closed the sluice valve (not illustrated) provided on the piping on the chemical reactor side, the pipe is connected to the piping of the skid. Keeping closed the sluice valve 7 provided on the top ends of said pipes (62, 63, 64 and 65 in FIG. 3) of the maintenance skid, the maintenance skid is filled with the inert gas for heat exchange coming from the heat exchange medium storage tank 66. This filling operation may be performed before or after connection.

The sluice valve provided on the pipe of the chemical reactor side and a sluice valve 7 on the pipe of the maintenance skid are opened to equalize the pressures of both reactors. After pressure equalization, the other sluice valve 7 on the pipe of the maintenance skid is opened and closed to form a closed circulation system; then the fan 63 is started. This operation causes the heat exchange medium to start to circulate between both chemical reactors 10A and 10B, thereby initiating the heat transfer by the medium. In FIG. 4, arrows designate directions in which the heat exchange medium flows.

Figure 5:
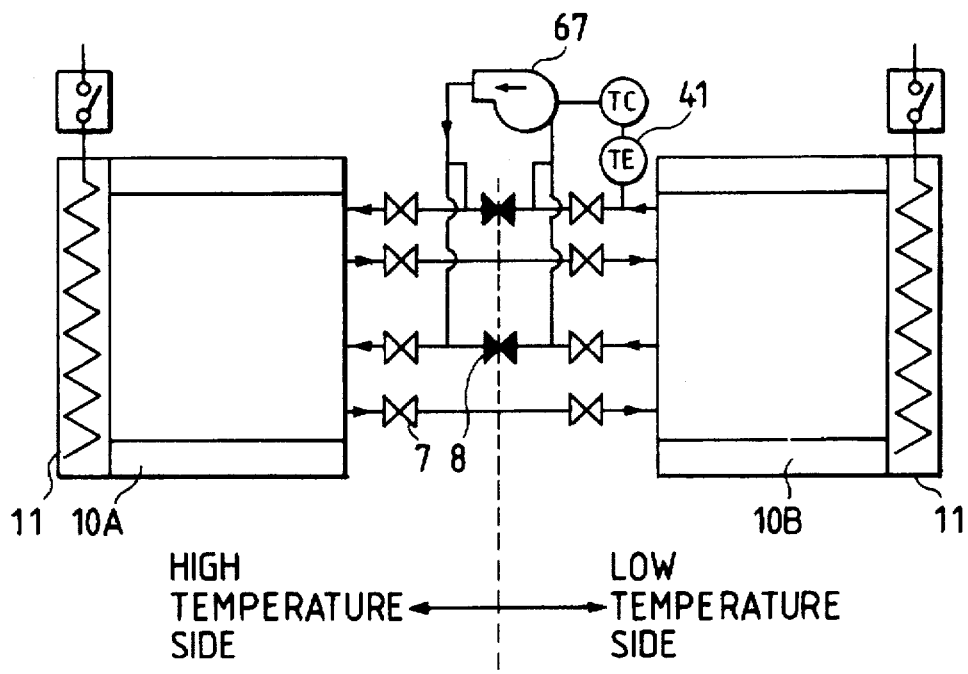
FIG. 5 is a conceptual view of an additional embodiment of a chemical reactor replacement apparatus according to the present invention.

Referring to FIG. 5, the method of replacing the chemical reactor is shown where thermal stress must be prevented from occurring due to sudden change of temperature, and the pressure inside the reactor must be kept within the tolerance, because of constraints of the process as hydrogen gas production equipment. Namely, according to the present embodiment, the temperature of the heat exchange medium is monitored by a thermometer (TE) 41, and the circulating flow rate is adjusted by the flow control of fan 67, based on the information from this thermometer. Furthermore, it is an effective way to install a differential pressure system in the circulating flow channel (not illustrated) to monitor the pressure of the heat exchange medium, and to carry out heat exchange while controlling the pressure. Arrows indicate directions in which the heat exchange medium flows.

In FIG. 5, numeral 42 denotes a controller (TC) for controlling the circulating flow-rate of the heat exchange medium and numeral 11 an electric heater which serves as an auxiliary temperature increasing means for the chemical reactor requiring a temperature rise in the heat exchange means according to the present invention. To be more concrete, in cases where there is plenty of margin with respect to hardware, in addition to the temperature rise due to heating by the heat exchange circulating medium, or where a great temperature change is allowed for part of the reactor, the heater is used in parallel to enable temperature rise.

Figure 6:
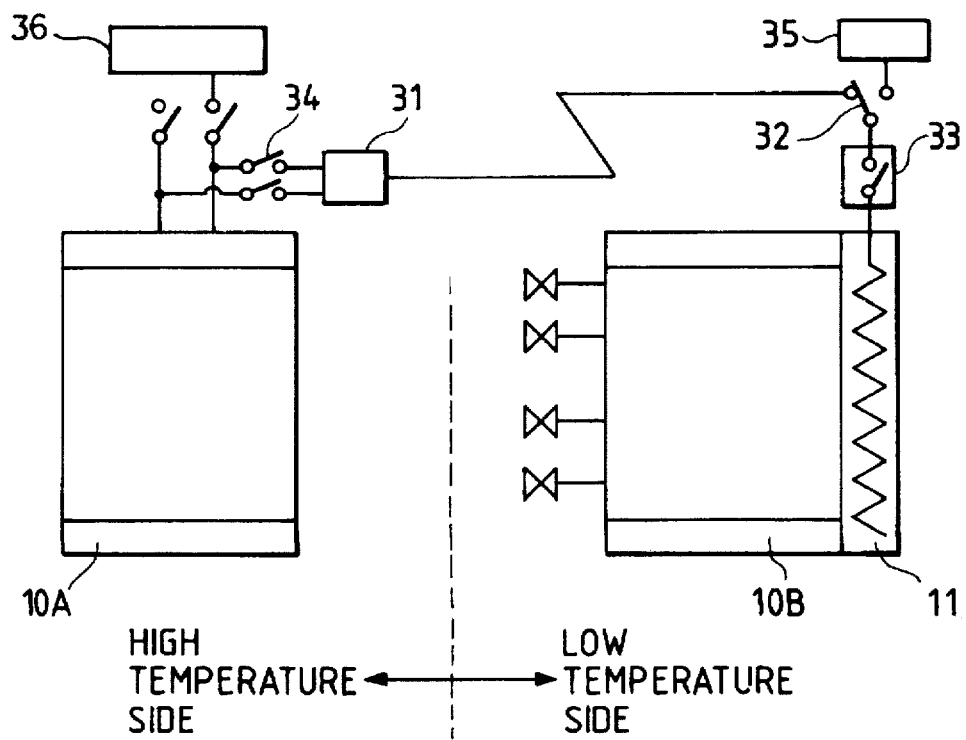
FIG. 6 is a conceptual view of yet another embodiment of a chemical reactor replacement apparatus according to the present invention.

Referring to FIG. 6, a suitable example of the method of replacing the chemical reactor is shown, where a power generation reaction is caused as in the fuel battery or by the supply of fuel. The chemical reactor on the high temperature side is ready to react at any moment; it reacts immediately when fuel gas is fed. Thus, it can be used as a heat source for temperature rise by turning off the electric connection on the normal power transmission line and by turning on the electric system for the heater 11 of the chemical reactor on the low temperature side. As illustrated in FIG. 6, in the case of this system, a switch 34, a DC/AC converter 31, a switch 32, and a heater power on-off switch 33 for the side requiring a temperature rise are installed on the maintenance skid, and the electric energy of the chemical reactor 10A that has been operated is supplied to the heater 11 installed on the chemical reactor 10B to be newly started; heating is thereby carried out. This heat can also be used as the main energy transfer means, or as an auxiliary heating means as discussed above.

The equipment illustrated in FIG. 6 can be used to raise the temperature above the operating temperature, to permit movement of the electric charge carrier on the reactor to be heated. Generally, in the case of a fuel battery, the reactor temperature must be raised over that level in the final stage. For this purpose, it is effective to raise the circulating gas temperature or to use this electric heater in parallel. In the case of the combined use of the heater, there is a constraint as regards the circulating flow channel, if observed in detail. Namely, when each of the reactors on the high and low temperature sides has reached the equilibrium, the pipe connected between the two batteries is isolated (disconnected), and the separately prepared fuel gas is fed to the battery to restart power generation; the power generated thereby is used to operate the heater. This means that a procedural constraint occurs to gas flow control. Furthermore, another method of combined use of the heater can be used to raise the temperature on the reactor on the low temperature side. To describe the method concretely, the chemical reactor to be paralleled off is electrically switched to the heater on the low temperature side before being paralleled off, and the temperature is raised by the heater before. After basis temperature rise, the reactor is paralleled off by this heater, and the temperature is raised to the operating point by the remaining heat capacity according to this method.

In FIG. 6, numeral 36 designates an inverter through which the electric power normally generated by the chemical reactor 10A is extracted and numeral 35 an alternating current supply source for the heater 11.

Figure 7:
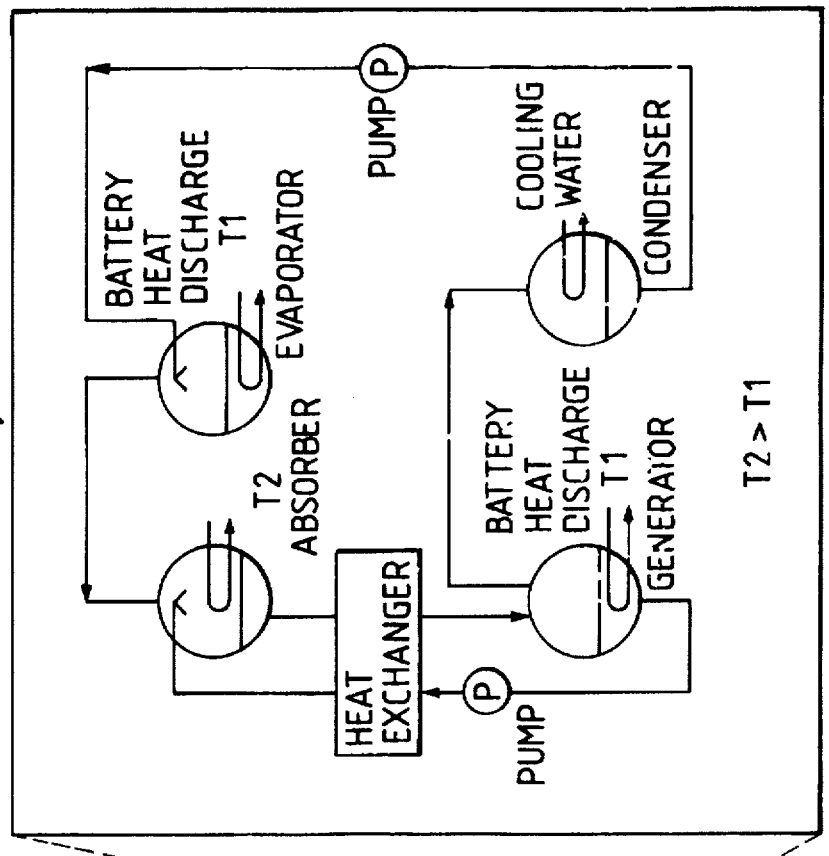
FIG. 7 is a conceptual view of a further embodiment of a chemical reactor replacement apparatus according to the present invention.
Figure 7:
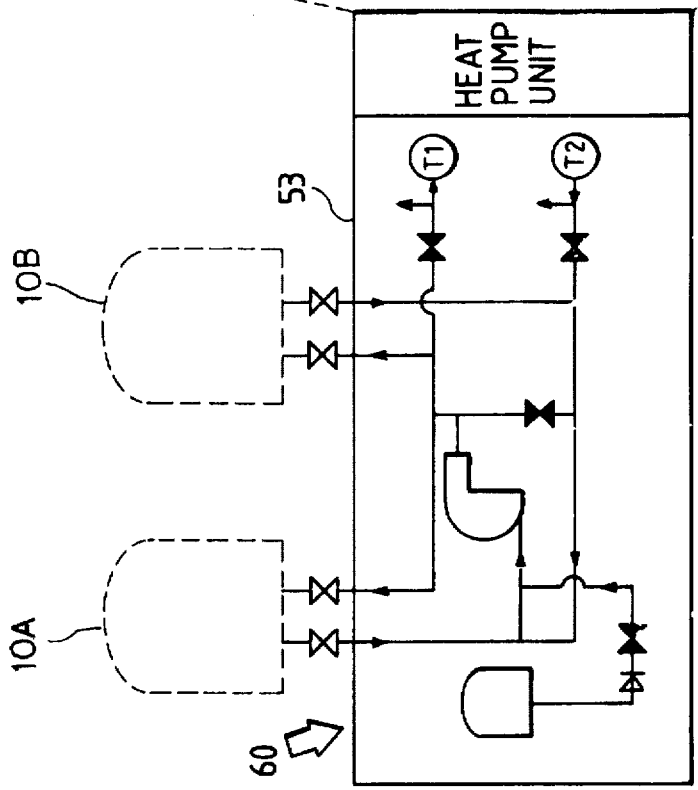

Referring to FIG. 7, there is shown an embodiment wherein heat exchange is performed by using a heat pump system. As a basic principle of the heat pump, it can be interpreted as being composed of a total of three systems; a system to recover heat from the lower heat source, and a system to permit supply of the recovered heat to the higher heat source, assuming two closed systems with different temperatures. One embodiment of the present invention is that the principle of heat exchange by this heat pump system is used to recover heat further from the side requiring operation stop after thermal equilibrium by said circulating medium; the recovered heat is fed to the side requiring a temperature rise. As shown in FIG. 7, the exhaust end T1 and suction end T2 in the piping system for circulation of the heat exchange medium of maintenance skid 60 are connected to the heat pump system 70, and the heat pump system is used to transfer the heat of the existing chemical reactor that has achieved thermal equilibrium to the chemical reactor to be newly started.

The heat pump system 70 is well known; therefore, the detailed description thereof is omitted. Furthermore, though the drawing shows the compression type heat pump, the well-known chemical heat accumulation type heat pump may also be used.

In FIG. 7, arrows designate directions in which the heat exchange medium flows.

Figure 8:
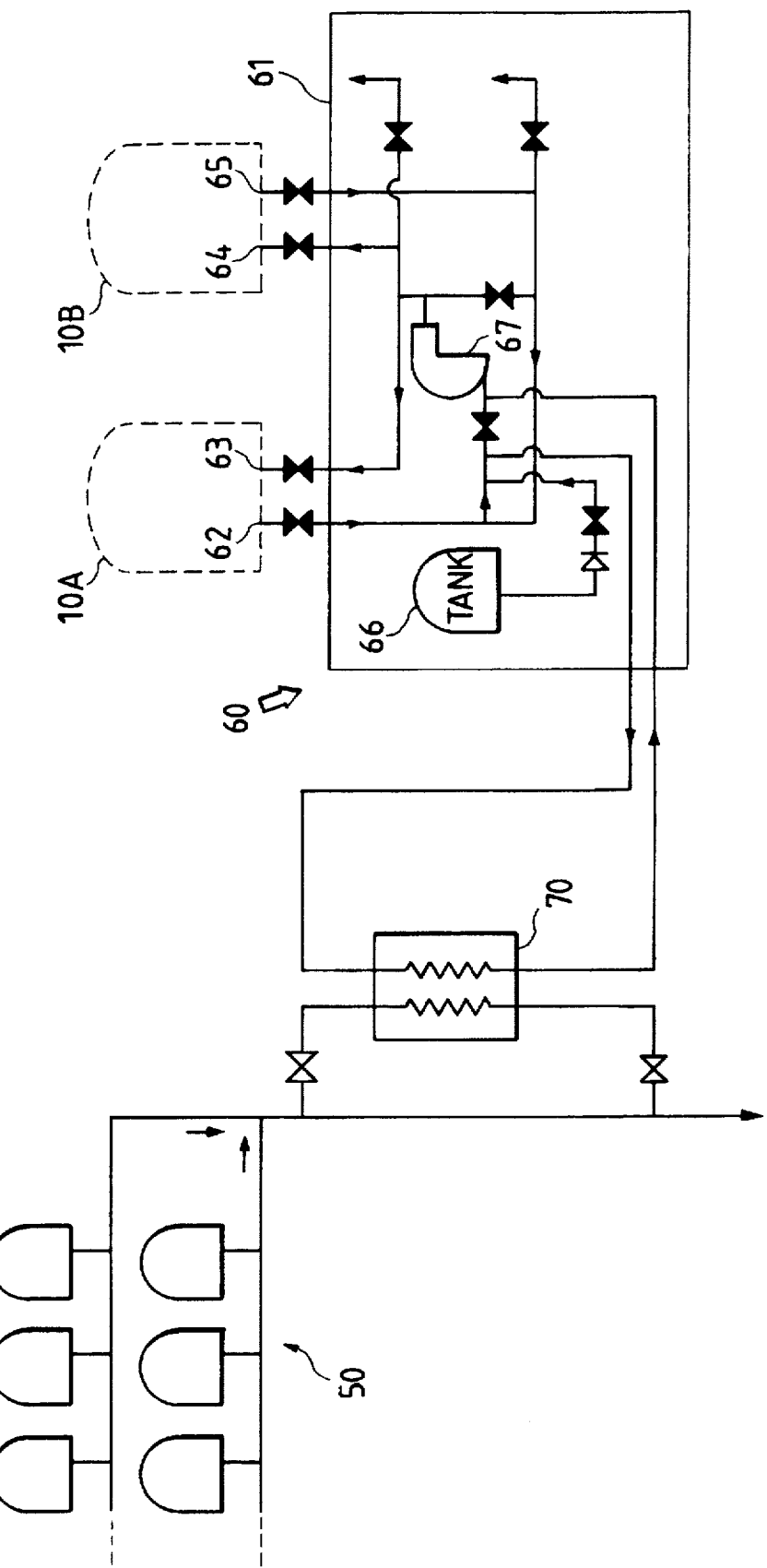
FIG. 8 is a conceptual view of get a further embodiment of a chemical reactor replacement apparatus according to the present invention.

Referring to FIG. 8, a part of the high temperature fluid is extracted from the piping system of the chemical reactor that has been operating, and is led to heat exchanger 70, whereas the heat exchange medium is led from the piping system of maintenance skid 60 to the heat exchanger 70, where the heat exchange medium is indirectly heated by heat exchange between the high temperature fluid and the heat exchange medium. This will accelerate the temperature rise of the chemical reactor to be newly started, up to the operation temperature.

In FIG. 8, arrows shown on the left designate directions in which the high temperature fluid flows and those shown on the right designate directions in which the heat exchange medium flows. Furthermore, numeral 69 denotes a flow control valve which serves to adjust the flow rate of the heat exchange medium flowing through the heat exchanger 70 according to the heat exchangeability thereof.

Heat exchange between two chemical reactors can be made without providing a piping system for circulation of the heat exchange medium, flow channel switching means, forced circulation means, heat exchange medium storage means, and their control means. Namely, though not shown in the drawings, heat exchange between two chemical reactors can be performed by heat transfer or radiation through a heat exchange medium such as air, by installing two reactors having temperature differences in a closed space or room which is reasonably well heat-insulated.

The above explanation deals with only a few of the embodiments according to the present invention, and many other varieties of embodiments are possible. For example, the specifically designed maintenance skid is used to connect between the pipe on the side of the chemical reactor that has been operating and that on the side of the chemical reactor to be newly started. This shows only the most preferable form. If the type of chemical reactor to be replaced or the chemical reaction process permit, the pipes of two reactors may be connected directly, without using the maintenance skid, and under that condition, a heat exchange medium such as air may be force-circulated by some appropriate means.

Furthermore, it can be easily seen that the present invention can be used to replace the reactors when the existing chemical reactor that has been operating has a temperature lower than the normal temperature, and the chemical reactor to be started newly has the temperature which is kept at the normal temperature.

In the reactor replacement which requires basic consideration when the chemical reactor is maintained, the technique described above reduces the thermal loss and the time required in the phase of shifting from the chemical reactor to be started to the operating point, and shortens the time of overloaded operation imposed on the chemical reactor as a remaining plant which has been operating without stopping, thereby making a significant contribution in improving the plant maintainability and availability rate of the entire plant.

What is claimed is:

1. A method of replacing a first chemical reactor in a chemical plant with a second chemical reactor, the temperature of the first chemical reactor during operation of the chemical plant being different from that while the chemical plant is not in operation, comprising the steps of:

transferring energy of the first chemical reactor to the second chemical reactor; and replacing the first chemical reactor with the second chemical reactor by removing the first chemical reactor from its operation position and installing the second chemical reactor at said operation position to operate in place of the first chemical reactor.

2. A method according to claim 1, further comprising the step of applying additional external energy to the second chemical reactor.

3. A method according to claim 1, wherein the energy is one of thermal energy and electric energy.

4. A method according to claim 1, wherein the energy transferring step includes circulating a heat exchange medium in a closed system including the first chemical reactor and the second chemical reactor so as to perform heat exchange therebetween.

5. A method according to claim 1, further comprising the step of locating the first chemical reactor and the second chemical reactor in a heat-isolated room, wherein the energy transferring step includes the step of circulating a heat exchange medium in the heat-isolated room to substantially balance thermally the first chemical reactor with the second chemical reactor.

6. A method according to claim 4, wherein the heat exchange medium is discharged after being circulated in the first chemical reactor and in the second chemical reactor.

7. A method according to claim 6, wherein the heat exchange medium is discharged into the atmosphere after circulating in the first and second chemical reactors.

8. A method according to claim 6, wherein the heat exchange medium is a gas.

9. A method of replacing at least one of a plurality of chemical reactors in a chemical plant with at least one energy-transferred chemical reactor other than the plurality of chemical reactors, the temperature of the at least one of a plurality of chemical reactors being different during operation of the chemical plant from that while the chemical plant is not in operation, comprising the steps of:

transferring energy of the at least one of the plurality of chemical reactors to the at least one energy-transferred chemical reactor other than the plurality of chemical reactors; and replacing the at least one of the plurality of chemical reactors with the at least one energy-transferred chemical reactor by removing the at least one of the plurality of chemical reactors from its operation position and installing the at least one energy-transferred chemical reactor at said operation position to operate in place of the at least one of the plurality of chemical reactors.

10. A method according to claim 9, further comprising the step of applying additional external energy to the at least one energy-transferred chemical reactor.

11. A method according to claim 10, wherein the additional external energy is received from chemical reactors which are operating in the chemical plant.

12. A method according to claim 9, wherein the energy is one of thermal energy and electric energy.

13. A method according to claim 9, wherein the energy transferring step includes circulating a heat exchange medium in a closed system including the at least one of the plurality of chemical reactors and the at least one energy-transferred chemical reactor with which the at least one of the plurality of chemical reactors is to be replaced, so as to perform heat exchange therebetween.

14. A method according to claim 13, further comprising the step of extracting fluid from at least one of the plurality of chemical reactors during said operation in the chemical plant, the energy transferring step further including performing heat exchange between the heat exchange medium and the extracted fluid.

15. A method according to claim 14, further comprising the step of communicating one of the at least one of the plurality of chemical reactors and the at least one energy-transferred chemical reactor with which the at least one of the plurality of chemical reactors is to be replaced by using a maintenance skid, the maintenance skid being provided with a pipe system through which the at least one of the plurality of chemical reactors and the at least one energy-transferred chemical reactor are communicated with each other.

16. A method according to claim 15, wherein the circulation of the heat exchange medium is carried out by using rotary equipment.

17. A method according to claim 9, further comprising the step of locating the at least one of the plurality of chemical reactors and the at least one energy-transferred chemical reactor in a heat-isolated room, the energy transferring step including circulating a heat exchange medium in the heat-isolated room thereby to substantially balance thermally the at least one of the plurality of chemical reactors and the at least one energy-transferred chemical reactor with each other.

18. A method according to claim 13, wherein the heat exchange medium is discharged after being circulated in the at least one of the plurality of chemical reactors and the at least one energy-transferred chemical reactor.

19. A method according to claim 18, wherein the heat exchange medium is discharged into the atmosphere after circulating in the at least one of the plurality of chemical reactors and the at least one energy-transferred chemical reactor.

20. A method according to claim 18, wherein the heat exchange medium is a gas.

21. A method of replacing at least one of a plurality of chemical reactors in a chemical plant with at least one energy-transferred chemical reactor other than the plurality of chemical reactors, the temperature of the at least one of a plurality of chemical reactors being different during operation of the chemical plant from that while the chemical plant is not in operation, comprising the steps of:

transferring energy of the at least one of the plurality of chemical reactors to the at least one energy-transferred chemical reactor other than the plurality of chemical reactors, so as to substantially balance thermally the at least one of the plurality of chemical reactors and the at least one energy-transferred chemical reactor with each other;

changing the temperature of the at least one energy-transferred chemical reactor to or closer to an operating temperature thereof; and replacing the at least one of the plurality of chemical reactors with the at least one energy-transferred chemical reactor whose temperature has been changed by removing the at least one of the plurality of chemical reactors from its operation position and installing the at least one energy-transferred chemical reactor at said operation position to operate in place of the at least one of the plurality of chemical reactors.

22. A method according to claim 21, wherein the temperature changing step is performed by using a heat pump system.

* * * * *